United States Patent [19]
Barr

[11] Patent Number: 5,724,306
[45] Date of Patent: Mar. 3, 1998

[54] METHOD FOR CORRECTING DUAL SENSOR DATA FOR IMPERFECT GEOPHONE COUPLING USING PRODUCTION SEISMIC DATA

[75] Inventor: Frederick James Barr, Houston, Tex.

[73] Assignee: Western Atlas International, Inc., Houston, Tex.

[21] Appl. No.: 580,634

[22] Filed: Dec. 29, 1995

[51] Int. Cl.⁶ ........................................ G01V 1/38
[52] U.S. Cl. ................. 367/15; 367/21; 181/110; 181/112
[58] Field of Search .................. 367/15, 20, 21, 367/177, 178; 181/110, 112, 401

[56] References Cited

U.S. PATENT DOCUMENTS 4,253,164  2/1981  Hall, Jr. ........................... 367/22
5,365,492  11/1994  Dragoset, Jr. .................. 367/21

*Primary Examiner*—J. Woodrow Eldred
*Attorney, Agent, or Firm*—Charles R. Schweppe

[57] ABSTRACT

A marine seismic surveying method recording with a first sensor a first signal indicative of pressure and with a second sensor a second signal indicative of motion, calculating a coupling mechanism filter for the second signal substantially correcting for the imperfect coupling of the second sensor, and applying a filter based on the coupling mechanism filter to at least one of the signals.

17 Claims, 6 Drawing Sheets

METHOD FOR CORRECTING DUAL SENSOR DATA FOR IMPERFECT GEOPHONE COUPLING USING PRODUCTION SEISMIC DATA

BACKGROUND OF THE INVENTION

1. Field of the Invention

The present invention relates generally to marine seismic surveying and more particularly to a method for minimizing the effects of coupling differences between geophones and hydrophones in Dual Sensor bottom cables used in marine seismic surveying.

2. Description of the Related Art

Marine seismic surveying is a method for determining the structure of subterranean formations located beneath bodies of water. Marine seismic surveying typically employs survey ships, which are equipped with energy sources, and receiving ships, which are equipped with seismic receivers. The energy sources produce compressional seismic waves which propagate through the water and into the subterranean formations below. Different formation layers typically have different acoustic impedances, since the impedance is the product of varying rock density and wave velocity. Thus a portion of the waves will reflect up from the interfaces between adjacent formation layers. The reflected waves propagate back up through the earth and through the overlying water. The seismic receivers in the water convert the passing reflected waves into electrical or optical signals which are typically recorded and then processed into information about the structure of the subterranean formations. The reflected waves continue upward and a portion may continue to reflect back and forth between the water surface and the earth below. These additional reflections are also detected by the seismic receivers and cause noise that obscures the desired data. These unwanted reflections between the top and bottom of the water layer are called water column reverberations.

Energy sources commonly used in marine seismic surveying are air guns and marine vibrators. Air guns discharge air quickly under very high pressure into the water. The discharged air forms a seismic shock wave which contains frequencies within the seismic range. Marine vibrators actuate an acoustic piston to vibrate at a selected range of seismic frequencies. Both air guns and marine vibrators produce seismic waves of pressure differentials which propagate through the water and into the subterranean formations below.

Seismic receivers commonly used in marine seismic surveying are pressure sensors and motion sensors. Pressure sensors, such as hydrophones, convert pressure changes which accompany compressional seismic waves into electrical or optical signals which are recorded for analog or digital processing. Hydrophones typically employ a piezoelectric element to convert the pressure changes into electrical or optical signals. Motion sensors, such as geophones, convert particle velocities which accompany compressional seismic waves into electrical or optical signals. Geophones typically employ an electrical coil suspended relative to a magnet to convert vertical movement into electrical or optical signals. Less commonly used as receivers in marine seismic surveying are accelerometers. Accelerometers convert particle accelerations which accompany compressional waves into electrical or optical signals.

The ocean bottom cable method uses seismic sensor units which are attached to cables and deployed from seismic survey boats to rest on the marine bottom and record seismic data. The ocean bottom cable method is employed in relatively shallow water where nearby obstructions preclude the use of a towed streamer cable. The Dual Sensor method uses seismic sensor units which each contain both a pressure sensor and a motion sensor, usually a hydrophone and a geophone, respectively. The seismic signals from the hydrophone and the geophone are combined during processing to attenuate the effect of water column reverberations. Although hydrophones are typically used in marine operations, geophones are normally used in land operations. On land the geophones are anchored to the ground by metal spikes to ensure fidelity of geophone motion to land motion. Additionally, anchoring keeps the geophones oriented closer to vertical, which ensures a better measuring of vertical motion. In marine operations, however, anchoring the geophones to the solid earth of the ocean bottom with spikes is economically impractical. Instead, the geophones are normally mounted in gimbal mechanisms in the sensor units, which are attached to the bottom cable. The seismic survey ship deploys the bottom cable onto the ocean bottom, where the geophones lie suspended within the gimbal mechanisms inside the sensor units. The gimbal mechanisms orient the geophones vertically for proper operation.

The seismic signals from the hydrophone and the geophone in the Dual Sensor unit are typically combined during processing to attenuate the effect of water-column reverberations. Thus ideally the mechanical and electrical response of each type of receiver should match. A matching response would ensure that differences between the respective signals were due to differences in the physical properties being measured rather than to differences in the sensors. However, the response of the two sensors in a bottom cable operation do differ. One reason for the difference in sensor response is the difference in how the two types of sensors are coupled to the medium in which the physical changes being measured by the sensors take place. Hydrophones are sensitive to pressure changes in the water in which the hydrophones are immersed. Thus hydrophones are well coupled to the environment. The signals detected with hydrophones substantially correspond to the pressure being measured. However, physically coupling geophones to the ocean bottom is economically impractical, except by gravity. Thus geophones are imperfectly coupled to the environment. The signals received from geophones do not always closely correspond to the vertical particle motion being measured. The imperfect coupling mechanism of the geophone must be corrected to match the response of the geophone to the response of the hydrophone for proper combining to attenuate water column reverberations.

F. J. Barr et al., *Attenuation of Water Column Reverberations using Pressure and Velocity Detectors in a Water-Bottom Cable*, 59th Annual Internat. Mtg., Soc. Expl. Geophys., Expanded Abstracts, 655, 1989, describes the theory of using both geophones and hydrophones to attenuate water-column reverberations. F. J. Barr, U.S. Pat No. 4,979,150, assigned to the assignee of the present invention, describes a method for using both geophones and hydrophones to attenuate water-column reverberations.

G. M. Hoover et al., *The Influence of the Planted Geophone on Seismic Land Data*, Geophysics, 45, 1239–1253, 1980, describes the physics of geophone ground coupling and some laboratory measurements of ground coupling with land geophones. C. E. Krohn, *Geophone Ground Coupling*, Geophysics, 49, 722–731, 1984, expands upon the Hoover et al. article and describes laboratory and field test measurements of ground coupling with land geophones.

Maxwell, P. W. et al., *Recording Reliability in Seismic Exploration as Influenced by Geophone-Ground Coupling,*

56th Mtg. and Tech. Exhib., EAEG, Expanded Abstracts, B014, 1994, describes a method of attaching a piezoelectric crystal device to a land geophone and applying an electric voltage to the crystal to tap the geophone. The response of the geophone to the tap is compared with the response of the geophone when coupling to the ground is known to be good. A filter can then be computed and applied to correct for less than optimum geophone to ground coupling.

F. J. Barr et al., U.S. Pat. No. 5,5,163,028 and U.S. Pat. No. 5,235,554, both patents assigned to the assignee of the present invention, describe a method of using information from a separate seismic data set called calibration shooting to determine the geophone coupling filter, along with other response differences between hydrophones and geophones.

None of the above articles or patents disclose a method using standard seismic equipment and production seismic data for correcting the effects of imperfect coupling of the geophone to the ocean bottom. Failure to correct for the response differences between the two types of sensors in the Dual Sensor method compromises the effectiveness of the attenuation of water column reverberations that can be achieved.

SUMMARY OF THE INVENTION

The present invention is a method for enhancing the effectiveness of marine surveying using a Dual Sensor ocean bottom cable. A first sensor generating a first signal indicative of pressure and a second sensor generating a second signal indicative of motion are deployed on the bottom of a body of water. A coupling mechanism filter is calculated for the second signal to correct for the imperfect coupling of the second sensor to the water bottom. A filter derived from the coupling mechanism filter is then applied to one of the signals to equalize the response of the two sensors.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

Figure 1:
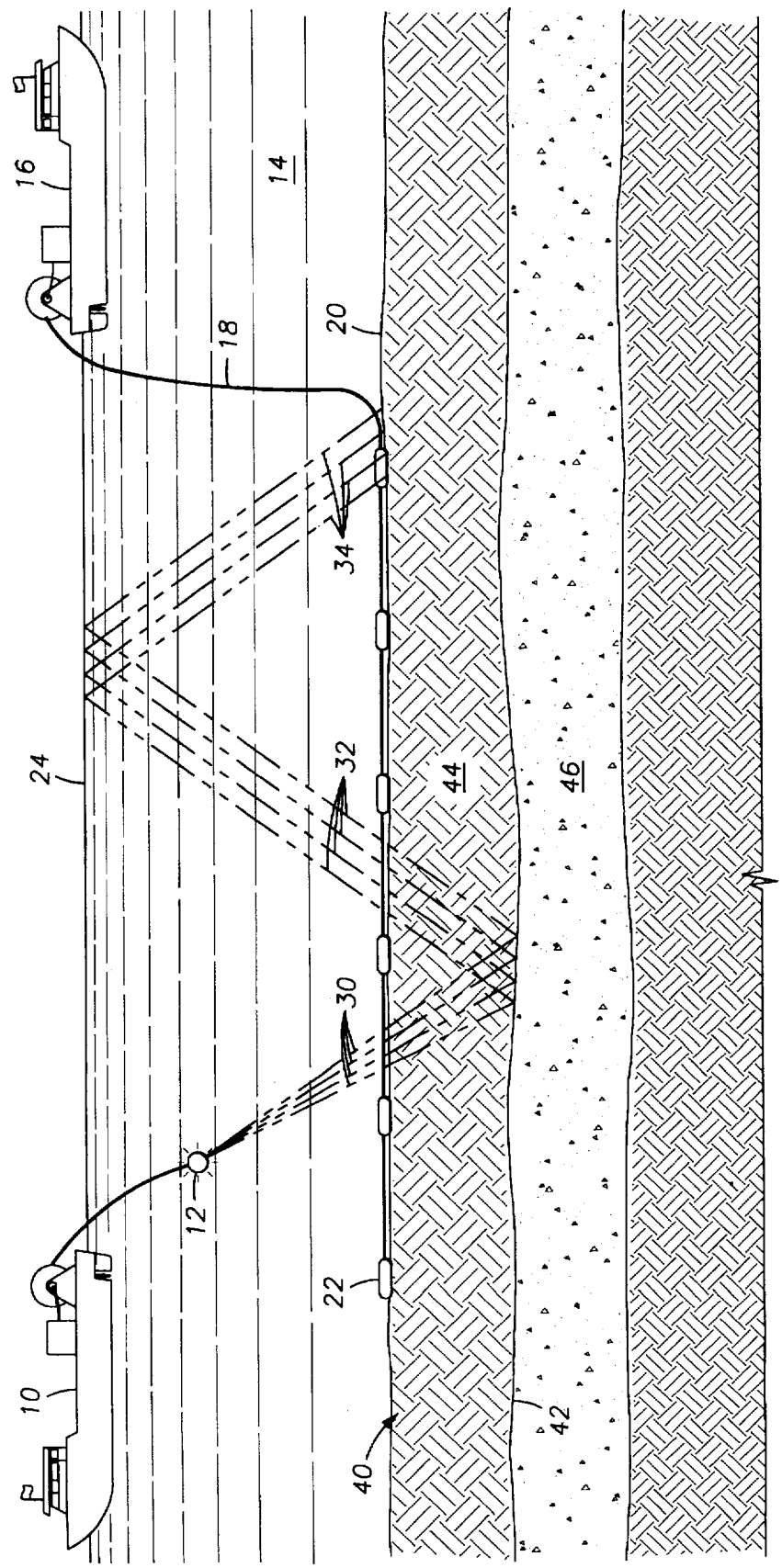
FIG. 1 is a diagrammatic view of marine seismic surveying utilizing the Dual Sensor ocean bottom cable method.

FIG. 1 shows a view of marine seismic surveying utilizing the Dual Sensor ocean bottom cable method. The bottom cable method employs a seismic survey ship 10 adapted for towing a seismic energy source 12 through a body of water 14. The seismic energy source 12 is an acoustic wave generating source, preferably an air gun. The bottom cable method typically also includes a receiving ship 16, preferably anchored in the body of water 14. The receiving ship 16 deploys a bottom cable 18 or a plurality of bottom cables 18 on the marine bottom 20. Each bottom cable 18 carries at least one Dual Sensor unit 22, but preferably carries a plurality of Dual Sensor units 22. Each Dual Sensor unit 22 contains a pressure sensor, preferably a hydrophone, and a motion sensor, preferably a geophone.

According to preferred practice, the receiving ship 16 or a separate cable handling ship (not shown) positions the bottom cable 18 with Dual Sensor units 22 on the marine bottom 20. The survey ship 10 typically moves at a constant speed along a predetermined path, such as a swath of parallel lines. The survey ship 10 generates seismic waves with the energy source 12 at predetermined locations along the path. After the survey ship 10 traverses each path, the receiving ship 16 or a separate cable handling ship retrieves the bottom cable 18 from the marine bottom 20. The receiving ship 16 or separate cable handling ship redeploys the bottom cable 18 at a new location, such as a line spaced from and parallel to the previous location of the bottom cable 18. The survey ship 10 then traverses another path, generating seismic waves with the energy source 12 at a new set of predetermined locations. The signals from the arrays of hydrophones and geophones are continuously recorded while the survey ship 10 fires the seismic energy source 12 at predetermined locations.

As the seismic energy source 12 generates seismic waves, a portion of the waves travel downward, as indicated by rays 30. A portion of the downward-traveling seismic waves are reflected up from interfaces between layers in the subterranean earth formations 40, such as interface 42 between layers 44 and 46, as illustrated. The reflected waves travel upwardly, as illustrated by rays The sensors in the Dual Sensor units 22 in the bottom cable 18 detect the reflected waves as the waves travel upward past the locations of the Dual Sensor units 22 on rays 32. The pressure and motion sensors in the Dual Sensor Units 22 generate electrical or optical signals representative of pressure and particle velocity changes in the wave field and transmit the generated electrical or optical signals back to the receiving ship 16 via the cable 18. The recording equipment (not shown) within the receiving ship 16 records the electrical or optical signals so that the signals can be processed to map the subterranean formations 40.

The upward-travelling reflected waves reach the surface 24 of the body of water 14, where a portion of the waves are reflected back downward, as illustrated by rays 34. Each of the sensors in the Dual Sensor units 22 again detects the reflected waves as the waves travel downward past the locations of the Dual Sensor units 22 on rays 34. The reflected waves may continue to reverberate back and forth between the water bottom 20 or subterranean formations 40 below and the water surface 24 above. The multiply-reflected waves reverberating through the water layer will be detected by the sensors in the Dual Sensor units 22 at each pass, but carry no useful information about the subterranean formations 40. Rather, the reverberating waves act as noise, obscuring the information-carrying signals from the first reflections off the formation 40 interfaces. The noise-generating waves are called water column reverberations.

Figure 2:
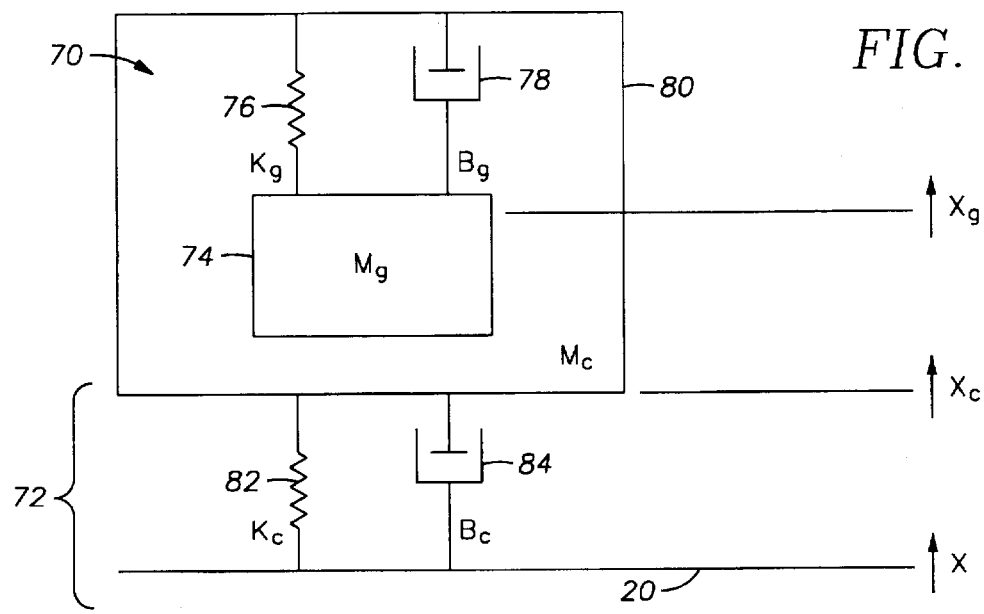
FIG. 2 is a diagrammatic view of a geophone and the geophone coupling mechanism.

FIG. 2 shows a diagrammatic view of a geophone 70 and the coupling mechanism 72 of the geophone 70 to the ground 20. The geophone 70 comprises a geophone coil 74 of mass $m_g$ suspended from a spring 76 inside a geophone case 80 of mass $m_c$. The geophone coil 74 acts as a classical damped harmonic oscillator, coupled to the geophone case 80 by a spring 76 with spring constant $K_g$ and a dashpot 78 with damping coefficient $B_g$. The imperfect coupling 72 of the geophone 70 to the ground 20 acts as a filter on the seismic signal from the geophone 70. The filtering effect of the imperfect geophone coupling mechanism 72 is a damped, second-order system, as shown in C. E. Krohn, *Geophone Ground Coupling*, Geophysics, 49, 722–731, 1984. The coupling mechanism 72 is a classical damped harmonic oscillator. Thus the geophone case 80 acts as a damped harmonic oscillator coupled to the ground 20 by an additional spring 82 with spring constant $K_c$ and an additional dashpot 84 with damping coefficient $B_c$. The response of the geophone coupling mechanism 72 as a harmonic oscillator depends upon the natural resonance frequency $f_c$ and damping coefficient $\zeta_c$ of the geophone coupling mechanism 72. The two variables $f_c$ and $\zeta_c$ are functions of the elastic constants of the ground 20 and the total mass of the Dual Sensor unit containing the geophone 70. The mass of the Dual Sensor unit is typically much greater than the mass of a land geophone 70 because of the additional mass of both the gimbal mounting mechanism and the hydrophone contained within the Dual Sensor unit. The gimbal mechanism is required to orient the geophone 70 vertically when the Dual Sensor unit comes to rest on the ocean bottom 20. The increased mass of the Dual Sensor unit and the lack of a spike to anchor the geophone 70 to the ground 20 cause the natural resonance frequency of the geophone coupling mechanism 72 to be much lower than the range measured by C. E. Krohn, *Geophone Ground Coupling*, Geophysics, 49, 722–731, 1984, for land geophones 70. As a result, the filtering effect on the reflection wavelets is even greater for geophones 70 in marine operations than in land operations.

The particle velocity manifestation accompanying the seismic waves causes the Dual Sensor unit and, therefore, the geophone case 80, to move in a vertical direction. The vertical component of the motion of the geophone case 80 is detected by the geophone 70 and results in a voltage wavelet which is digitized and recorded. However, the wavelet recorded from the geophone 70 is different from the wavelet recorded from the hydrophone because of the filtering effect of the geophone coupling mechanism 72. Let x indicate the true movement of the marine bottom 20, $x_c$ the movement of the geophone case 80 relative to the marine bottom 20, and $x_g$ the movement of the geophone coil 74 relative to the geophone case 80. The geophone 70 does not directly measure the true motion velocity (dx/dt) of the marine bottom 20. Instead, the geophone 70 measures the velocity $(d[x_c-x_g]/dt)$ of the geophone case 80 relative to the geophone coil 74, as altered by the geophone coupling mechanism 72.

Referring to FIG. 2, the total transfer function relating the geophone output voltage signal, $V_{out}$, to the true ground velocity, (dx/dt), is derived here. Newton's second law applied to the balance of forces on two masses, the geophone coil 74 and geophone case 80, yields the following two equations, $$\begin{cases} m_g \frac{d^2 x_g}{dt^2} + B_g \left( \frac{dx_g}{dt} - \frac{dx_c}{dt} \right) + K_g(x_g - x_c) = 0 & (1) \\ m_c \frac{d^2 x_c}{dt^2} + B_c \left( \frac{dx_c}{dt} - \frac{dx}{dt} \right) + K_c(x_c - x) = 0. & (2) \end{cases}$$

Eq. (1) states that the sum of the forces acting on the geophone coil 74 is zero. Similarly, Eq. (2) states that the sum of the forces acting on the geophone case 80 is zero. Let X, $X_c$, and $X_g$ be the Laplace transforms, respectively, of the variables x, $x_c$, and $x_g$. Then the Laplace transforms of Eqs. (1) and (2) are, respectively, $$\begin{cases} m_g s^2 X_g + B_g s(X_g - X_c) + K_g(X_g - X_c) = 0 & (3) \\ m_c s^2 X_c + B_c s(X_c - X) + K_c(X_c - X) = 0. & (4) \end{cases}$$

Multiplying through and regrouping the negative terms in Eqs. (3) and (4) yields the following corresponding equations, $$\begin{cases} m_g s^2 X_g + B_g s X_g + K_g X_g = B_g s X_c + K_g X_c & (5) \\ m_c s^2 X_c + B_c s X_c + K_c X_c = B_c s X + K_c X. & (6) \end{cases}$$

Factoring out the X, $X_c$ and $X_g$ variables in Eqs. (5) and (6) yields the following corresponding equations, $$\begin{cases} (m_g s^2 + B_g s + K_g) X_g = (B_g s + K_g) X_c & (7) \\ (m_c s^2 + B_c s + K_c) X_c = (B_c s + K_c) X. & (8) \end{cases}$$

Solving Eqs. (7) and (8) for $X_g$ and $X_c$, respectively, yields $$\begin{cases} X_g = \dfrac{B_g s + K_g}{m_g s^2 + B_g s + K_g} X_c & (9) \\ X_c = \dfrac{B_c s + K_c}{m_c s^2 + B_c s + K_c} X. & (10) \end{cases}$$

The output voltage, $V_{out}$, of the geophone is proportional to the difference in velocity between the geophone coil 74 and the geophone case 80. Thus $$V_{out} = s(X_c - X_g). \qquad (11)$$

Substituting the values for $X_g$ and $X_c$ from Eqs. (9) and (10), respectively, into Eq. (11) yields $$V_{out} = \frac{s(B_c s + K_c)X}{m_c s^2 + B_c s + K_c} - \frac{s(B_g s + K_g)X_c}{m_g s^2 + B_g s + K_g}. \qquad (12)$$

Substituting the value for $X_c$ from Eq. (10) again into Eq. (12) yields $$V_{out} = \frac{s(B_c s + K_c)X}{m_c s^2 + B_c s + K_c} - \frac{s(B_g s + K_g)(B_c s + K_c)X}{(m_g s^2 + B_g s + K_g)(m_c s^2 + B_c s + K_c)}. \qquad (13)$$

The transfer function between the geophone's output voltage $V_{out}$ and marine bottom velocity (dx/dt) is given by $$\frac{V_{out}}{sX} = \frac{(B_c s + K_c)(m_g s^2 + B_g s + K_g) - (B_g s + K_g)(B_c s + K_c)}{(m_g s^2 + B_g s + K_g)(m_c s^2 + B_c s + K_c)}. \qquad (14)$$

Multiplying through, subtracting like terms, and dividing numerator and denominator by the product $m_c \cdot m_g$ in Eq. (14) yields the following result for the geophone transfer function, $$\frac{V_{out}}{sX} = \frac{(B_c s + K_c) m_g s^2}{(m_g s^2 + B_g s + K_g)(m_c s^2 + B_c s + K_c)} \qquad (15)$$

$$= \frac{\left(\dfrac{B_c}{m_c} s + \dfrac{K_c}{m_c}\right) s^2}{\left(s^2 + \dfrac{B_g}{m_g} s + \dfrac{K_g}{m_g}\right)\left(s^2 + \dfrac{B_c}{m_c} s + \dfrac{K_c}{m_c}\right)} \qquad (16)$$

In Eq. (16), each of the denominator's factors can be expressed in the form $$s^2 + 2\zeta\omega_n s + \omega_n^2 \quad (17)$$

where $\omega_n$ = natural frequency,
$\zeta$ = damping coefficient.

So, analyzing Eq. (17) in terms of Eq. (16) gives the natural frequency $\omega_g$ and damping coefficient $\zeta_g$ for the geophone 70 as $$\omega_g^2 = \frac{K_g}{m_g}, \text{ thus}$$

$$\omega_g = \sqrt{\frac{K_g}{m_g}}, \quad (18)$$

$$2\zeta_g \omega_g = \frac{B_g}{m_g}, \text{ thus}$$

$$\zeta_g = \frac{B_g}{2\omega_g m_g} = \frac{B_g \sqrt{m_g}}{2\sqrt{K_g}\, m_g} = \frac{B_g}{2\sqrt{K_g}\sqrt{m_g}}. \quad (19)$$

Likewise, the natural frequency $\omega_c$ and damping coefficient $\zeta_c$ for the geophone coupling mechanism are given by $$\omega_c = \sqrt{\frac{K_c}{m_c}}, \quad (20)$$

$$\zeta_c = \frac{B_c}{2\sqrt{K_c}\sqrt{m_c}}. \quad (21)$$

For the complex Laplace variable $s = \sigma + i\omega$, letting the real part $\sigma = 0$ gives $s = i\omega$, the Fourier transform. Here $\omega = 2\pi f$, which relates the natural frequency $\omega$ in radians to the natural frequency $f$ in Hertz. Substituting for $s$ in Eq. (16) gives the geophone transfer function as $$\frac{V_{out}}{i\omega X} = \frac{-\omega^2\left(\frac{K_c}{m_c} + i\omega\frac{B_c}{m_c}\right)}{\left(\frac{K_g}{m_g} - \omega^2 + i\omega\frac{B_g}{m_g}\right)\left(\frac{K_c}{m_c} - \omega^2 + i\omega\frac{B_c}{m_c}\right)} \quad (22)$$

$$= \frac{-\omega^2\left(\frac{K_c}{m_c} + i\omega\frac{B_c}{m_c}\right)\frac{m_g}{K_g}}{\left(1 - \omega^2\frac{m_g}{K_g} + i\omega\frac{B_g}{K_g}\right)\left(\frac{K_c}{m_c} - \omega^2 + i\omega\frac{B_c}{m_c}\right)} \quad (23)$$

$$= \frac{-\omega^2\left(1 + i\omega\frac{B_c}{K_c}\right)\frac{m_g}{K_g}}{\left(1 - \omega^2\frac{m_g}{K_g} + i\omega\frac{B_g}{K_g}\right)\left(1 - \omega^2\frac{m_c}{K_c} + i\omega\frac{B_c}{K_c}\right)} \quad (24)$$

Squaring and inverting Eq. (18) yields $$\frac{m_g}{K_g} = \frac{1}{\omega_g^2}. \quad (25)$$

Manipulating Eq. (19) and using Eq. (18) gives the following relations for the geophone constants, $$\frac{B_g}{2\sqrt{K_g}\sqrt{m_g}} = \zeta_g \quad (26)$$

$$\frac{B_g}{\sqrt{K_g}} = 2\zeta_g\sqrt{m_g}$$

-continued $$\frac{B_g}{K_g} = 2\zeta_g \sqrt{\frac{m_g}{K_g}} = \frac{2\zeta_g}{\omega_g}.$$

Likewise, the following relations hold for the coupling mechanism constants, $$\frac{m_c}{K_c} = \frac{1}{\omega_c^2}, \quad (27)$$

$$\frac{B_c}{K_c} = \frac{2\zeta_c}{\omega_c}. \quad (28)$$

Substituting Eq. (25) through (28) into Eq. (24) yields a new form for the transfer function, $$\frac{V_{out}}{i\omega X} = \frac{-\frac{\omega^2}{\omega_g^2}\left(1 + i\frac{\omega}{\omega_c}2\zeta_c\right)}{\left(1 - \frac{\omega^2}{\omega_g^2} + i\frac{\omega}{\omega_g}2\zeta_g\right)\left(1 - \frac{\omega^2}{\omega_c^2} + i\frac{\omega}{\omega_c}2\zeta_c\right)}. \quad (29)$$

Since the natural frequencies in radians and Hertz are related by $\omega = 2\pi f$, the geophone transfer function as given by Eq. (2) can be written as $$\frac{V_{out}}{i\omega X} = \quad (30)$$

$$\frac{-\left(\frac{f}{f_g}\right)^2\left[1 + i\left(\frac{f}{f_c}\right)2\zeta_c\right]}{\left[1 - \left(\frac{f}{f_g}\right)^2 + i\left(\frac{f}{f_g}\right)2\zeta_g\right]\left[1 - \left(\frac{f}{f_c}\right)^2 + i\left(\frac{f}{f_c}\right)2\zeta_c\right]}.$$

Here $\omega_g = 2\pi f_g$ and $\omega_c = 2\pi f_c$ define the natural frequencies $f_g$ and $f_c$ for the geophone 70 and the geophone coupling mechanism 72, respectively.

A similar expression for the hydrophone 60 transfer function may be derived as $$\frac{V_{out}}{i\omega X} = \quad (31)$$

$$\frac{-\left(\frac{f}{f_h}\right)^2\left[1 + i\left(\frac{f}{f_m}\right)2\zeta_m\right]}{\left[1 - \left(\frac{f}{f_h}\right)^2 + i\left(\frac{f}{f_h}\right)2\zeta_h\right]\left[1 - \left(\frac{f}{f_m}\right)^2 + i\left(\frac{f}{f_m}\right)2\zeta_m\right]}.$$

Here $f_h$ and $\zeta_h$ represent the natural frequency and damping coefficient, respectively, for the hydrophone 60, while $f_m$ and $\zeta_m$ represent the natural frequency and damping coefficient, respectively, for the hydrophone coupling mechanism. The hydrophone 60 is well coupled to the water. Thus it is preferable to use an high value, such as $f_m = 2000$ Hz, for the natural frequency of the hydrophone coupling mechanism in Eq. (31). Similarly, it is preferable to use the critical value, $\zeta_m = 0.7$, for the damping coefficient of the hydrophone coupling mechanism in Eq. (31).

Taking a ratio of the geophone transfer function of Eq. (30) to the hydrophone transfer function of Eq. (31) yields the following expression $$\frac{\left(\frac{f}{f_s}\right)^2 \left[1+i\left(\frac{f}{f_c}\right)2\zeta_c\right]\left[1-\left(\frac{f}{f_h}\right)^2+i\left(\frac{f}{f_h}\right)2\zeta_h\right]\left[1-\left(\frac{f}{f_m}\right)^2+i\left(\frac{f}{f_m}\right)2\zeta_m\right]}{\left(\frac{f}{f_h}\right)^2 \left[1+i\left(\frac{f}{f_m}\right)2\zeta_m\right]\left[1-\left(\frac{f}{f_s}\right)^2+i\left(\frac{f}{f_s}\right)2\zeta_s\right]\left[1-\left(\frac{f}{f_c}\right)^2+i\left(\frac{f}{f_c}\right)2\zeta_c\right]} \qquad (32)$$

Figure 3:
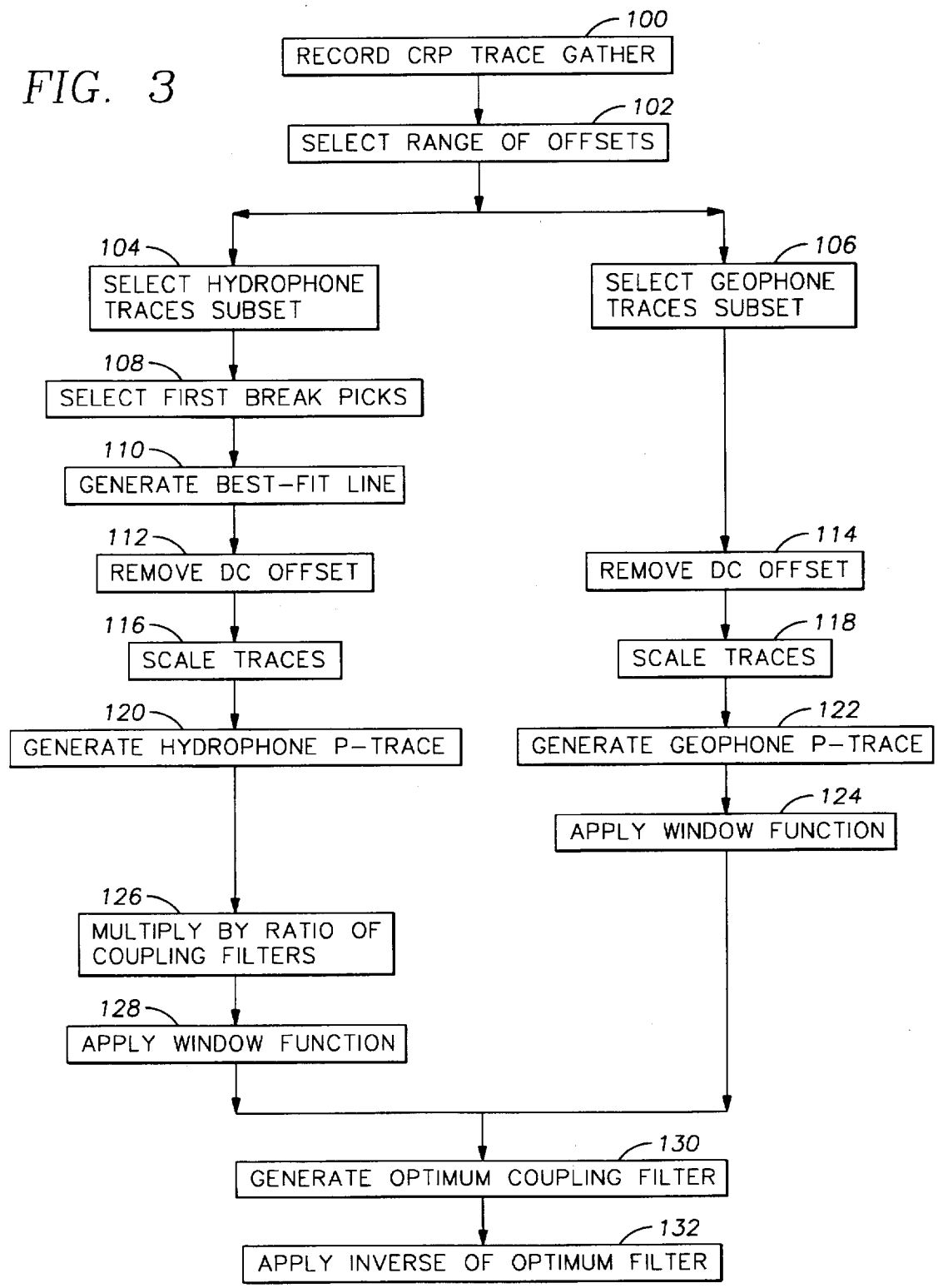
FIG. 3 is a schematic diagram of the preferred method of the present invention.

FIG. 3 shows a schematic diagram of the preferred method of the present invention. Common-receiver-point (CRP) trace gathers are recorded, as shown in Block 100. A middle range of source-receiver offsets is selected for the seismic survey area, as shown in Block 102. Preferably, the range of offsets in Block 102 is selected to yield approximately 10 to 20 traces in each CRP gather from Block 100 having first-breaks refracted from a common subsurface horizon. Ten to 20 traces provide a sufficient number of traces to combine into a slant-stacked trace yielding a better signal-to-noise ratio than the individual traces, as will be discussed later.

For each CRP gather from Block 100, the traces in the hydrophone CRP gather falling in the range of offsets from Block 102 are selected, generating the hydrophone traces subset, as shown in Block 104. The traces in the geophone CRP gather which correspond to the traces in the hydrophone traces subset from Block 104 are selected, generating the geophone traces subset, as shown in Block 106. The first-break peaks of the traces in the hydrophone traces subset from Block 104 are selected, generating the set of first-break picks, as shown in Block 108. A least-mean-squared-error straight line in the x-t plane is fitted to the set of first-break picks from Block 108, generating the best-fit line, as shown in Block 110.

Any nonzero DC offset is removed from both the hydrophone traces subset from Block 104, as shown in Block 112, and from the geophone traces subset from Block 106, as shown in Block 114. The DC offset is the average of all the time sample values in each recorded seismic trace. Each of the hydrophone and geophone traces subsets is scanned for the respective highest-amplitude first-break peak. The traces in both the hydrophone and geophone traces subsets are scaled to equalize all the first-break peak amplitudes, as shown in Block 116 and Block 118, respectively. The signal-to-noise ratio of the individual traces can be improved by combining the traces in the traces subsets using a tau-p transform for a single value of p, ie., a single slant. The tau-p transform is a Radon transform using straight lines, which generates a slant-stacked trace called a p-trace. After correcting for the static deviation in each hydrophone trace, a hydrophone p-trace is generated from the scaled hydrophone traces subset from Block 116, as shown in Block 120. Similarly, a geophone p-trace is generated from the scaled geophone traces subset from Block 118, as shown in Block 122. The static deviations are indicated by the time offset between the set of first-break peaks for the hydrophone traces subset from Block 108 and the best-fit line from Block 110.

The Dual Sensor method combines hydrophone and geophone signals to attenuate the effects of water column reverberation. The present invention corrects for the imperfect geophone coupling mechanism to make the hydrophone and geophone signals similar enough for effective combination. Generating hydrophone and geophone p-traces yields traces representative of the hydrophone and geophone signals, but with better signal-to-noise ratios than the individual hydrophone and geophone traces. However, analysis of several data sets from various locations around the world reveals that the hydrophone and geophone p-traces generated in Blocks 120 and 122 are extremely dissimilar in the time period shortly after the first-break peaks from Block 108. The time at which the dissimilarity becomes extreme is typically 10 to 20 milliseconds after the first trough and the following peak in the amplitude of the first-breaks in the hydrophone traces. The dissimilarity between the hydrophone and geophone p-traces is greater than can be attributed to the effect of imperfect geophone coupling mechanism alone. Thus a window function is applied to limit the combining of the geophone and hydrophone signals to the time period in which the two signals are sufficiently similar after correction for the imperfect geophone coupling mechanism.

Two window functions have been found to work well. Let $t_1$ be the time of the zero crossing between the first trough and the following peak on the hydrophone or geophone p-trace, whichever occurs later. Let $t_2$ be the time of the next zero crossing after time $t_1$ on the hydrophone or geophone p-trace, whichever occurs later. A preferred window function has a value of 1.0 from time t=0 seconds to the time $t_2$. The preferred window function can be defined by $$\begin{cases} 0, t<0 \\ 1, 0 \le t \le t_2 \\ 0, t_2 < t \end{cases} \qquad (33)$$

An alternative window function has a value of 1.0 from time t=0 seconds to the time $t_1$. From that point in time forward, the value of the window function exponentially decays at a rate such that the value at the time $t_2$ is $e^{-2}$. Thus the alternative window function can be defined by $$\begin{cases} 0, t<0 \\ 1, 0 \le t \le t_1 \\ \exp\left[-2\left(\frac{t-t_1}{t_2-t_1}\right)\right], t_1 < t \end{cases} \qquad (34)$$

The geophone p-trace from Block 122 is multiplied by the preferred window function of Eq. (33), as shown in Block 124. Alternatively, the geophone p-trace from Block 122 could be multiplied by the alternative window function of Eq. (34).

The ratio of geophone to hydrophone transfer functions derived earlier and given by Eq. (32) is applied to the non-windowed hydrophone p-trace from Block 120, as shown in Block 126. The ratio of transfer functions in Eq. (32) provides a measure of the relative effects of the hydrophone and geophone coupling mechanisms. Because the hydrophone is well coupled to the water, a natural frequency of $f_m$=2000 Hz and a damping coefficient of $\zeta_m$=0.7 for the hydrophone coupling mechanism are preferably used. The same window function used in Block 124 is applied to the hydrophone p-trace from Block 126, as shown in Block 128.

An iterative, multi-variable search for the geophone coupling mechanism filter which minimizes the mean-squared error between the geophone p-trace from Block 124 and the hydrophone p-trace from Block 128 is performed. The parameters varied in the search are the natural frequency $f_c$ and damping coefficient $\zeta_c$ of the geophone coupling mechanism. The search generates an optimum geophone coupling mechanism filter, as shown in Block 130. A multidimensional downhill simplex method is preferably used to implement the search. A computer program for the downhill simplex method can be found in W. H. Press et al., *Numerical Recipes in C*, Cambridge University Press, 1992. Preferably, the optimum geophone coupling mechanism filter found in Block 130 is inverted and applied to all the traces in the original geophone CRP gather of Block 100, as shown in Block 132. Alternatively, the optimum geophone coupling mechanism filter found in Block 130 can be directly applied to all the traces in the original hydrophone CRP gather of Block 100.

Figure 4:
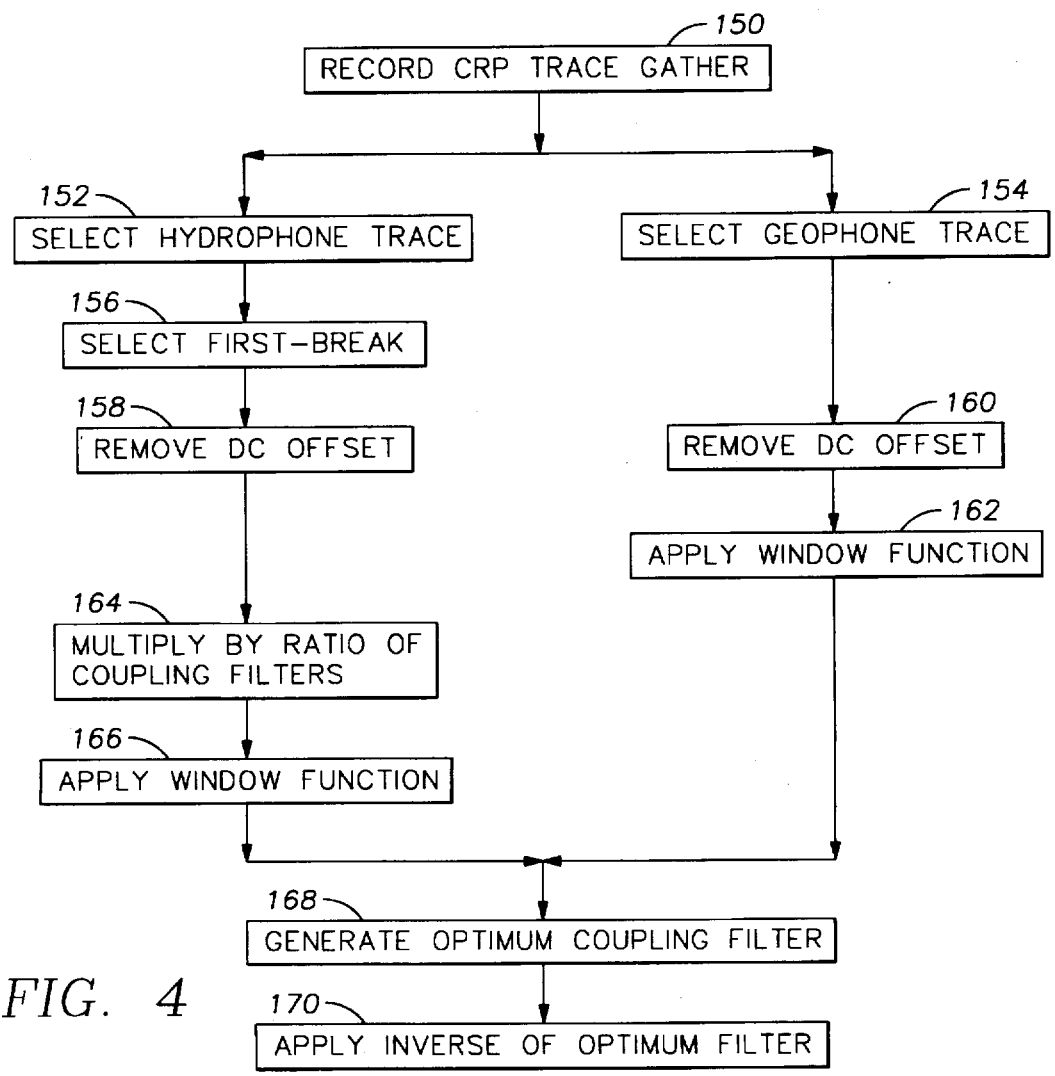
FIG. 4 is a schematic diagram of an alternative embodiment of the method of the present invention.

If the signal-to-noise ratio of the individual hydrophone and geophone traces is acceptable, then generating the hydrophone and geophone p-traces is not required. FIG. 4 shows a schematic diagram of an alternative method of the present invention. Common-receiver-point (CRP) trace gathers are recorded, as shown in Block 150. For each CRP gather from Block 100, a hydrophone trace in the hydrophone CRP gather is selected, generating the hydrophone trace, as shown in Block 152. The corresponding trace in the geophone CRP gather is selected, generating the geophone trace, as shown in Block 154. The first-break peak of the hydrophone trace from Block 152 is selected, generating the first-break, as shown in Block 156. Nonzero DC offset is removed from both the hydrophone trace from Block 152, as shown in Block 158, and from the geophone trace from Block 154, as shown in Block 160. The geophone trace from Block 160 is multiplied by the preferred window function of Eq. (33), as shown in Block 162. Alternatively, the geophone trace from Block 160 can be multiplied by the alternative window function of Eq. (34).

The ratio of geophone to hydrophone transfer functions given by Eq. (32) is applied to the non-windowed hydrophone trace from Block 158, as shown in Block 164. A natural frequency of $f_m=2000$ Hz and a damping coefficient of $\zeta_m=0.7$ for the hydrophone coupling mechanism are preferably used. The same window function used in Block 162 is applied to the hydrophone trace from Block 164, as shown in Block 166.

An iterative, multi-variable search for the geophone coupling mechanism filter which minimizes the mean-squared error between the geophone trace from Block 162 and the hydrophone trace from Block 166 is performed. The parameters varied in the search are the natural frequency $f_c$ and damping coefficient $\zeta_c$ of the geophone coupling mechanism. The search generates an optimum geophone coupling mechanism filter, as shown in Block 168. Preferably, the optimum geophone coupling mechanism filter found in Block 168 is inverted and applied to all the traces in the original geophone CRP gather of Block 150, as shown in Block 170. Alternatively, the optimum geophone coupling mechanism filter found in Block 168 can be directly applied to all the traces in the original hydrophone CRP gather of Block 150.

Figure 5:
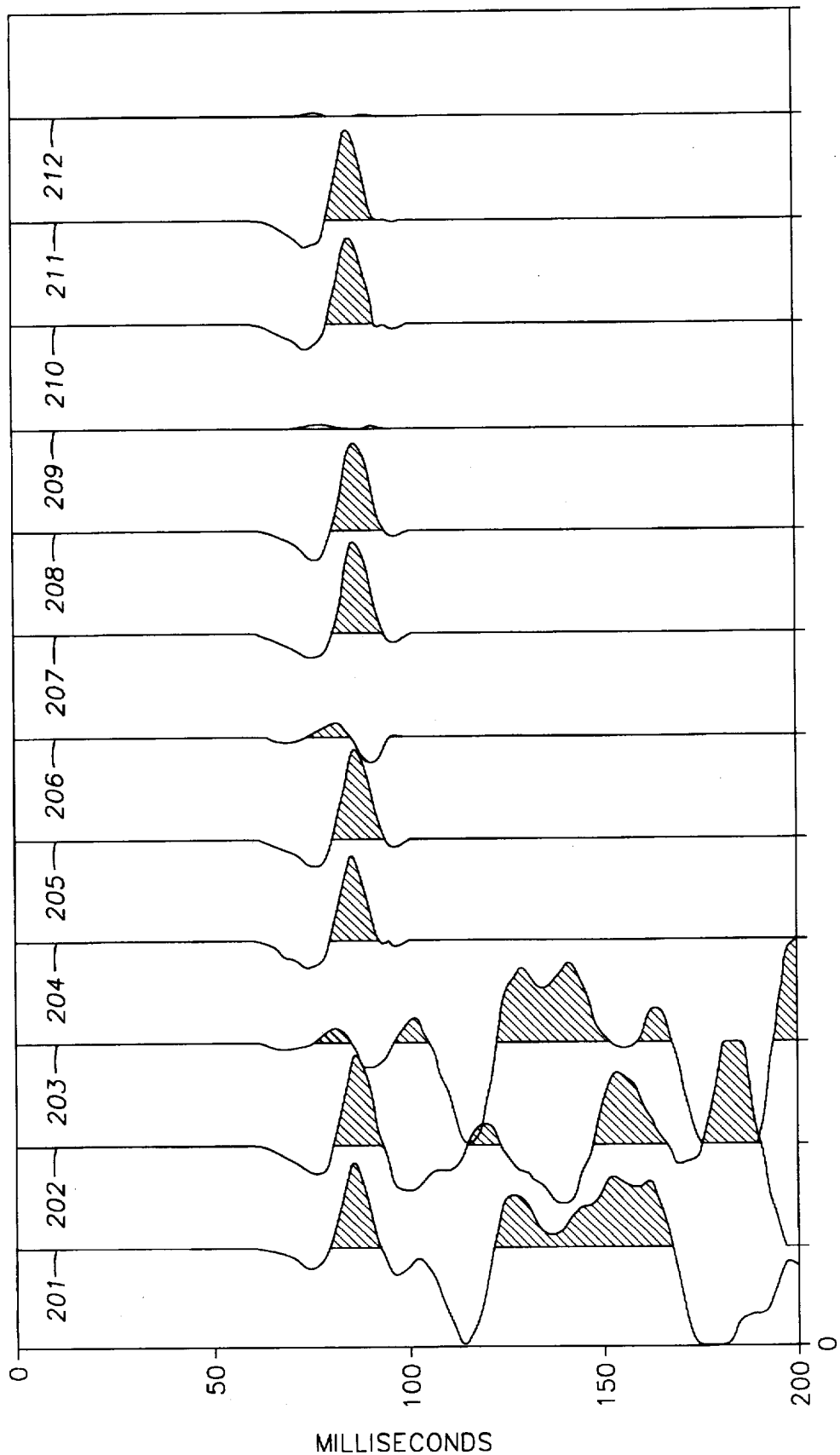
FIG. 5 is an example of the series of p-traces generated by the method of the present invention for data from a survey in the Gulf of Mexico.
Figure 6:
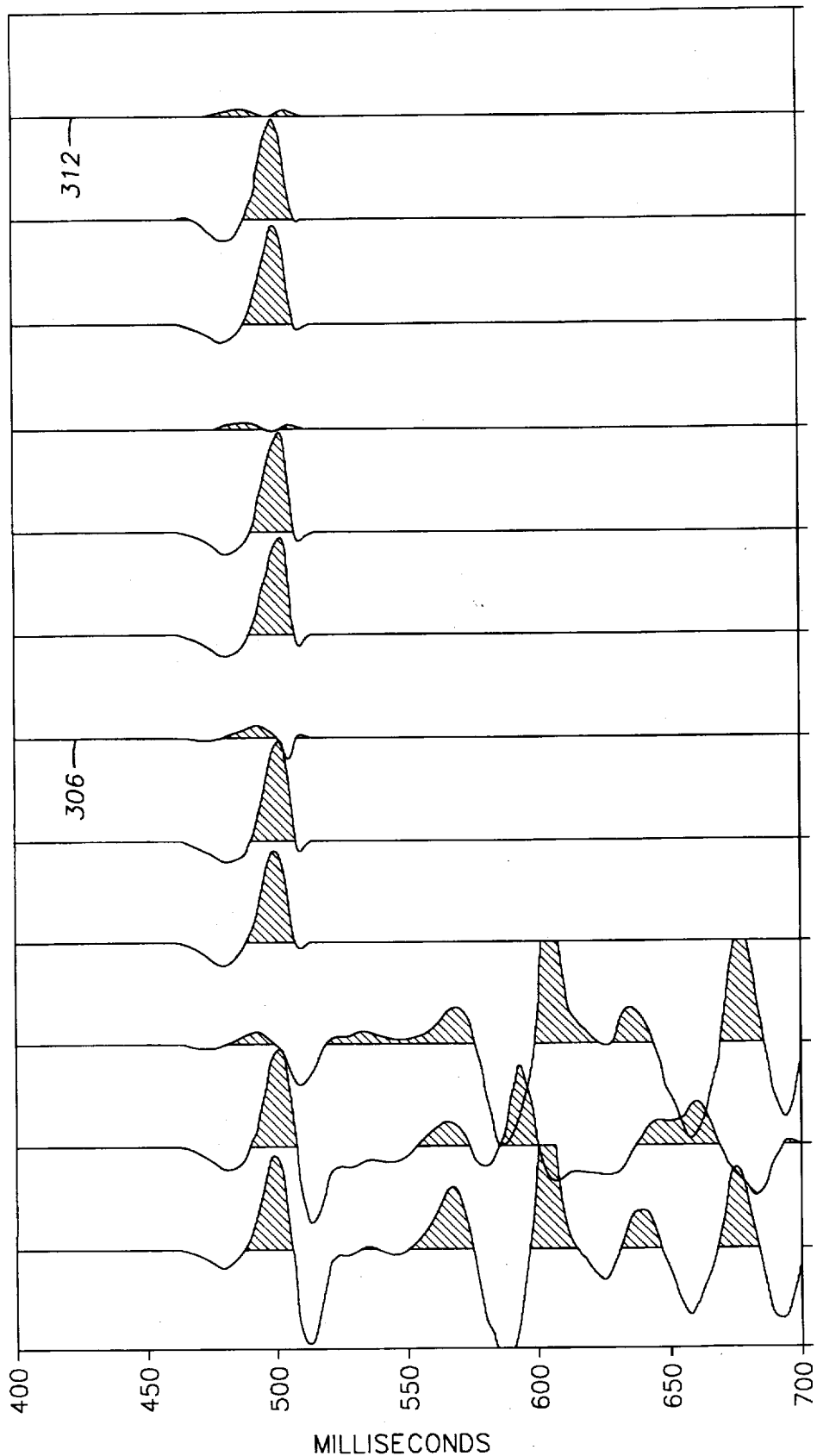
FIG. 6 is an example of the series of p-traces generated by the method of the present invention for data from a survey in offshore Gabon.
Figure 7:
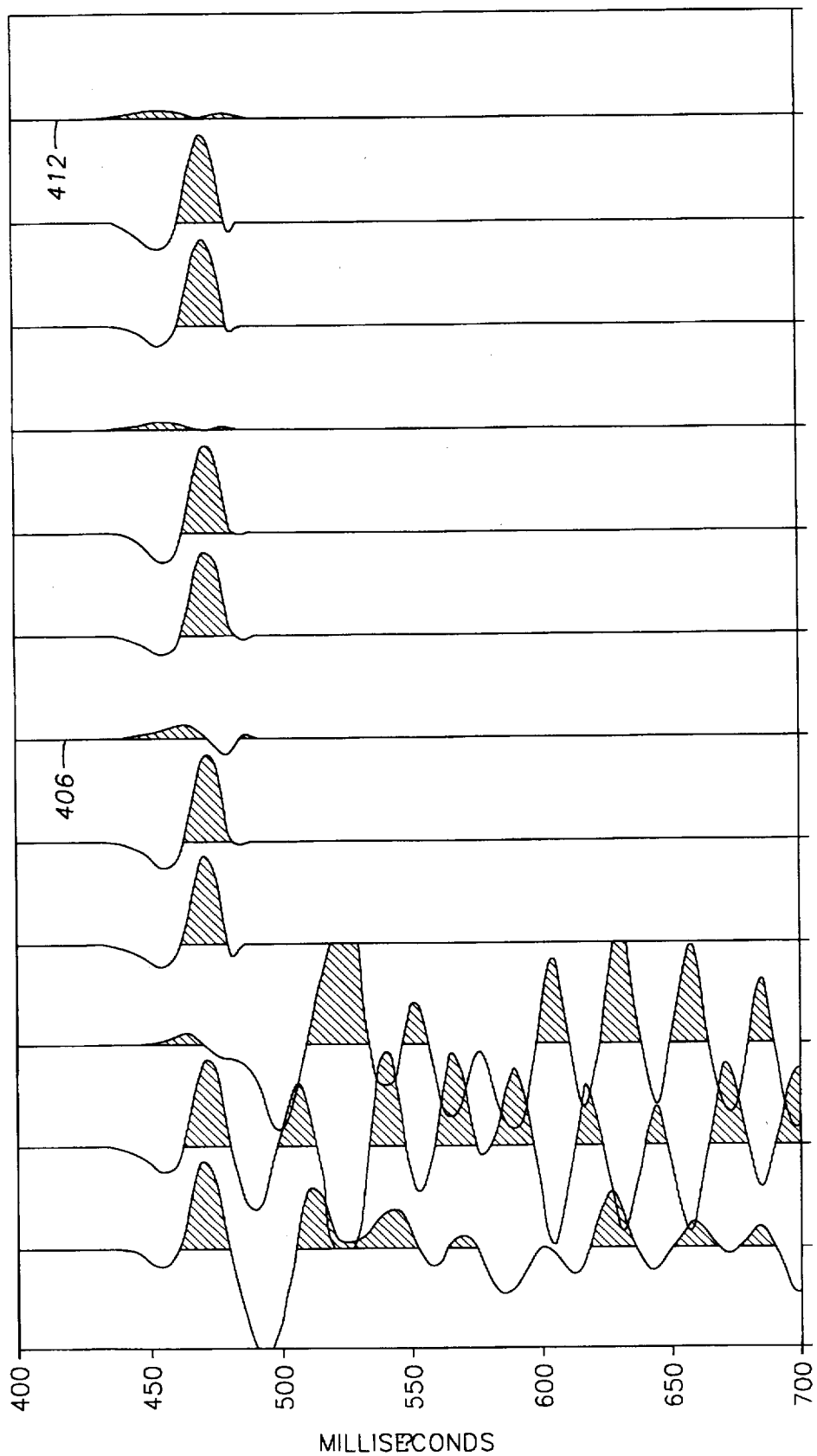
FIG. 7 is an example of the series of p-traces generated by the method of the present invention for data from a survey in Lake Maracaibo, Venezuela.

Application of the method of the present invention to data from three Dual Sensor ocean bottom cable surveys is illustrated in FIGS. 5-7. FIG. 5 shows the series of p-traces generated by the method of the present invention for the Gulf of Mexico data. Trace 201 is the hydrophone p-trace constructed from the hydrophone traces subset. Trace 202 is the geophone p-trace constructed from the corresponding geophone traces subset. Trace 203 is the hydrophone p-trace 201 minus the geophone p-trace 202. Trace 204 and trace 205 are the hydrophone p-trace 201 and the geophone p-trace 202, respectively, with the preferred window function of Eq. (33) applied. Trace 206 is the windowed hydrophone p-trace 204 minus the windowed geophone p-trace 205. Trace 206 indicates the degree to which the attenuation of water column reverberations by the Dual Sensor method is compromised by the filtering effect of imperfect geophone coupling, even after trace scaling. Trace 207 is the hydrophone p-trace 201 after application of the optimum geophone coupling mechanism filter followed by application of the preferred window function of Eq. (33). Trace 208 is a repeat of the windowed geophone p-trace 205. Trace 209 is the windowed, filtered hydrophone p-trace 207 minus the windowed geophone p-trace 208. Trace 210 is a repeat of the windowed hydrophone p-trace 206. Trace 211 is the geophone p-trace 202 after application of the inverse of the optimum geophone coupling mechanism filter followed by the preferred window function of Eq. (33). Trace 212 is the windowed hydrophone p-trace 210 minus the windowed, inversely filtered geophone p-trace 211. The amplitude of trace 212 is reduced from the amplitude of trace 206 by over 14 dB. The optimum parameters found for the geophone coupling mechanism were natural frequency $f_c=46.7$ Hz and damping coefficient $\zeta_c=1.36$.

FIG. 6 shows the same series of p-traces as FIG. 5 for data from a common-receiver-gather from a survey offshore Gabon. The improvement in Dual Sensor reverberation attenuation from use of the present invention is indicated by the reduction in amplitude of over 12 dB from trace 312 to trace 306. The optimum parameters found for the geophone coupling mechanism were natural frequency $f_c=25.5$ Hz and damping coefficient $\zeta_c=1.97$.

FIG. 7 shows the same series of p-traces as FIGS. 5 and 6 for a common-receiver-gather from a survey in Lake Maracaibo, Venezuela. The improvement in Dual Sensor reverberation attenuation from use of the present invention is indicated by the reduction in amplitude of almost 7 dB from trace 412 to trace 406. The optimum parameters found for the geophone coupling mechanism were natural frequency $f_c=27.3$ Hz and damping coefficient $\zeta_c=2.30$.

The present invention has been described with a certain degree of specificity. Variations will occur to those skilled in the art which are within the scope of the invention, which is limited only by the appended claims.

I claim:

1. A method of marine seismic surveying, comprising the steps of:

recording with a first sensor a first signal indicative of pressure and with a second sensor a second signal indicative of motion, said sensors deployed on a marine bottom;

calculating a coupling mechanism filter for said second sensor, said coupling mechanism filter substantially correcting for imperfect coupling of said second sensor to said marine bottom, by calculating a first transfer function for said first signal, calculating a second transfer function for said second signal, taking the ratio of said second transfer function to said first transfer function, applying said ratio to said first signal, generating a third signal, and optimizing said coupling mechanism filter to minimize the difference between said second signal and said third signal; and applying a filter based upon said coupling mechanism filter to at least one of said signals.

2. The method of claim 1, wherein said recording step comprises the steps of:

deploying an ocean bottom cable on the bottom of a body of water;

deploying on said ocean bottom cable a first sensor generating a first signal indicative of pressure in said water and a second sensor generating a second signal indicative of vertical motion of said bottom and influenced by imperfect coupling of said second sensor to said bottom, wherein said second sensor is in close proximity to said first sensor;

generating a seismic signal in said body of water;

detecting said seismic signal with said first and second sensors; and generating signals with said first and second sensors indicative of said seismic signal.

3. The method of claim 1, wherein said applying step comprises the step of:

applying the inverse of said coupling mechanism filter to said second signal.

4. The method of claim 1, wherein said applying step comprises the step of:

applying said coupling mechanism filter to said first signal.

5. The method of claim 1, wherein the optimizing step comprises the step of:

performing an iterative, multivariable search to minimize the mean-squared-error between said second signal and said third signal.

6. The method of claim 5, wherein the variables varied in said search are the natural frequency $f_c$ and damping coefficient $\zeta_c$ of said second transfer function.

7. The method of claim 5, wherein said search is accomplished by a multidimensional, downhill simplex method.

8. The method of claim 1, wherein said first transfer function is given as a function of frequency f by $$\frac{-\left(\frac{f}{f_1}\right)^2 \left[1+i\left(\frac{f}{f_c}\right)2\zeta_c\right]}{\left[1-\left(\frac{f}{f_1}\right)^2+i\left(\frac{f}{f_1}\right)2\zeta_1\right]\left[1-\left(\frac{f}{f_c}\right)^2+i\left(\frac{f}{f_c}\right)2\zeta_c\right]}$$

where $f_1$=natural frequency of said first sensor, $f_c$=natural frequency of said coupling mechanism of said first sensor, $\zeta_1$=damping coefficient of said first sensor, $\zeta_c$=damping coefficient of said coupling mechanism of said first sensor.

9. The method of claim 1, wherein said second transfer function is given as a function of frequency f by $$\frac{-\left(\frac{f}{f_2}\right)^2 \left[1+i\left(\frac{f}{f_c}\right)2\zeta_c\right]}{\left[1-\left(\frac{f}{f_2}\right)^2+i\left(\frac{f}{f_2}\right)2\zeta_2\right]\left[1-\left(\frac{f}{f_c}\right)^2+i\left(\frac{f}{f_c}\right)2\zeta_c\right]}$$

where $f_2$=natural frequency of said second sensor, $f_c$=natural frequency of said coupling mechanism of said second sensor, $\zeta_2$=damping coefficient of said second sensor, $\zeta_c$=damping coefficient of said coupling mechanism of said second sensor.

10. The method of claim 8, wherein said natural frequency $f_c$ of said coupling mechanism of said first sensor is 2000 Hz and said damping coefficient $\zeta_c$ of said coupling mechanism of said first sensor is 0.7.

11. The method of claim 1, further comprising the steps of:

applying a window function to said second signal before calculating said second transfer function; and applying said window function to said third signal before calculating said first transfer function.

12. The method of claim 11, wherein said window function is given by $$\begin{cases} 0, t<0 \\ 1, 0 \leq t \leq t_2 \\ 0, t_2 < t \end{cases}$$

where t=time, and $t_2$=time of the latter of the zero crossings immediately following the zero crossing between the first trough and the following peak on said first signal or said second signal.

13. The method of claim 11, wherein said window function is given by $$\begin{cases} 0, t<0 \\ 1, 0 \leq t \leq t_1 \\ \exp\left[-2\left(\frac{t-t_1}{t_2-t_1}\right)\right], t_1 < t \end{cases}$$

where t=time, $t_1$=time of the latter of the zero crossings between the first trough and the following peak on said first signal or said second signal, and $t_2$=the time of the latter of the next zero crossings on said first signal or said second signal after said time $t_1$.

14. The method of claim 1, further comprising the steps of:

generating a first traces subset by selecting a plurality of first sensor traces from said first signal;

generating a second traces subset by selecting the second sensor traces from said second signal corresponding to said selected first sensor traces;

selecting first-break peaks of said first traces subset;

fitting a least-mean-squared-error straight line in the x-t plane to said first break peaks in said first traces subset;

removing any DC offset from said first and second traces subsets;

scanning each of said first and second traces subsets for highest amplitude of the peaks of said first breaks;

scaling traces in each of said first and second traces subsets to equalize said amplitude of said first-break peaks;

generating a single slant-stacked trace from each of said first and second traces subsets using the slope of said least-mean-squared-error straight line; and using said slant-stacked traces as said first and second signals in said calculating a coupling mechanism filter step.

15. The method of claim 14, wherein said generating said first traces subset step comprises the steps of:

selecting a middle range of source receiver offsets in the survey area with approximately 10 to 20 traces in each common-receiver-point trace gather having first-breaks refracted from a common subsurface horizon; and generating said first traces subset by selecting said first sensor traces from said common-receiver-point trace gather falling in said offset range.

16. The method of claim 14, wherein said generating a single slant-stacked trace step comprises the steps of:

taking data samples from each of the traces in said first and second traces subset at the points where the traces intersect a line with the same slope as the slope of said least-mean-squared-error straight line;

averaging the values of said traces at said data samples; and repeating said taking and said averaging steps for a plurality of said lines with the same slope as the slope of said least-mean-squared-error straight line.

17. The method of claim 1, further comprising the steps of:

selecting a first trace from said first signal;

generating a second trace by selecting the trace from said second signal corresponding to said selected first trace;

selecting first-break of said first trace;

removing any DC offset from said first and second traces; and using said first and second traces as said first and second signals in said calculating a coupling mechanism filter step.

* * * * *